(12) United States Patent
Cassingham et al.

(10) Patent No.: US 8,877,662 B2
(45) Date of Patent: Nov. 4, 2014

(54) SILICA GLASS HAVING IMPROVED PROPERTIES

(75) Inventors: Nathan J. Cassingham, Euclid, OH (US); Ben Matthew Gauthier, University Heights, OH (US); Martin Panchula, Eastlake, OH (US); Robert Stephen Pavlik, Corning, NY (US); Yan Zhou, Gates Mills, OH (US); Konstantin S. Zuyev, Plymouth, MN (US)

(73) Assignee: Momentive Performance Materials, Inc., Waterford, NY (US)

( * ) Notice: Subject to any disclaimer, the term of this patent is extended or adjusted under 35 U.S.C. 154(b) by 27 days.

(21) Appl. No.: 13/540,204

(22) Filed: Jul. 2, 2012

(65) Prior Publication Data
US 2013/0116108 A1 May 9, 2013

Related U.S. Application Data (63) Continuation-in-part of application No. 13/477,396, filed on May 22, 2012, which is a continuation-in-part of application No. 11/557,805, filed on Nov. 8, 2006, now abandoned.

(60) Provisional application No. 60/805,300, filed on Jun. 20, 2006, provisional application No. 61/503,305, filed on Jun. 30, 2011.

(51) Int. Cl.
| | |
|---|---|
| *C03C 3/06* | (2006.01) |
| *C03C 3/087* | (2006.01) |
| *C03C 1/02* | (2006.01) |
| *C03B 1/00* | (2006.01) |

(52) U.S. Cl.
CPC .............. *C03C 1/02* (2013.01); *C03B 2201/50* (2013.01); *C03B 2201/24* (2013.01); *C03B 2201/34* (2013.01); *C03B 2201/075* (2013.01); *C03B 2201/32* (2013.01); *C03B 2201/31* (2013.01); *C03B 2201/54* (2013.01); *C03B 2201/08* (2013.01); *C03C 3/06* (2013.01); *C03B 2201/23* (2013.01); *C03B 1/00* (2013.01)
USPC ............................................... 501/54; 501/70

(58) Field of Classification Search
CPC .. C03C 3/06; C03C 2201/06; C03C 2201/08; C03C 2201/11; C03C 2201/12; C03C 2201/34; C03C 2201/40; C03C 2201/50
USPC ....................................................... 501/54, 70
See application file for complete search history.

(56) References Cited

U.S. PATENT DOCUMENTS 7,429,546 B2 *  9/2008  Iwahashi et al. ................ 501/54
7,687,418 B2 *  3/2010  Peuchert et al. ................ 501/64
(Continued)

FOREIGN PATENT DOCUMENTS

WO   WO/2004/089836   * 10/2004
WO   WO 2005/085147   *  9/2005

*Primary Examiner* — Noah Wiese
(74) *Attorney, Agent, or Firm* — Joseph E. Waters; McDonald Hopkins LLC (57) ABSTRACT

The invention relates to a silica glass compound having improved physical and chemical properties. In one embodiment, the present invention relates to a silica glass having a desirable brittleness in combination with a desirable density while still yielding a glass composition having a desired hardness and desired strength relative to other glasses. In another embodiment, the present invention relates to a silica glass composition that contains at least about 85 mole percent silicon dioxide and up to about 15 mole percent of one or more dopants selected from F, B, N, Al, Ge, one or more alkali metals (e.g., Li, Na, K, etc.), one or more alkaline earth metals (e.g., Mg, Ca, Sr, Ba, etc.), one or more transition metals (e.g., Ti, Zn, Y, Zr, Hf, etc.), one or more lanthanides (e.g., Ce, etc.), or combinations of any two or more thereof.

26 Claims, 7 Drawing Sheets

(56) References Cited

U.S. PATENT DOCUMENTS 7,964,522 B2 * 6/2011 Moore et al. .................... 501/54

2002/0151425 A1 * 10/2002 Fujinoki et al. ................. 501/54

* cited by examiner

SILICA GLASS HAVING IMPROVED PROPERTIES

RELATED APPLICATION DATA

The present application is a continuation-in-part and claims priority to co-pending U.S. patent application Ser. No. 11/557,805, filed Nov. 8, 2006, which claims priority to U.S. Provisional Patent Application No. 60/805,300, filed Jun. 20, 2006, is a continuation-in-part and claims priority to co-pending U.S. patent application Ser. No. 13/477,396, filed May 22, 2012, and claims priority to U.S. Provisional Patent Application No. 61/503,305, filed Jun. 30, 2011, the entireties of which are hereby incorporated by reference in their entireties herein.

FIELD OF THE INVENTION

The invention relates to a silica glass compound having improved physical and chemical properties. In one embodiment, the present invention relates to a silica glass having a desirable brittleness in combination with a desirable density while still yielding a glass composition having a desired hardness and desired strength relative to other glasses. In still another embodiment, the present invention relates to a silica glass composition that contains at least about 85 mole percent silicon dioxide with the remainder of the glass compositions of the present invention being selected from one or more dopants and/or impurities. In still another embodiment, the present invention relates to a silica glass composition that contains at least about 85 mole percent silicon dioxide and up to about 15 mole percent of one or more dopants selected from F, B, N, Al, Ge, one or more alkali metals (e.g., Li, Na, K, etc.), one or more alkaline earth metals (e.g., Mg, Ca, Sr, Ba, etc.), one or more transition metals (e.g., Ti, Zn, Y, Zr, Hf, etc.), one or more lanthanides (e.g., Ce, etc.), or combinations of any two or more thereof.

BACKGROUND OF THE INVENTION

Figure 1:
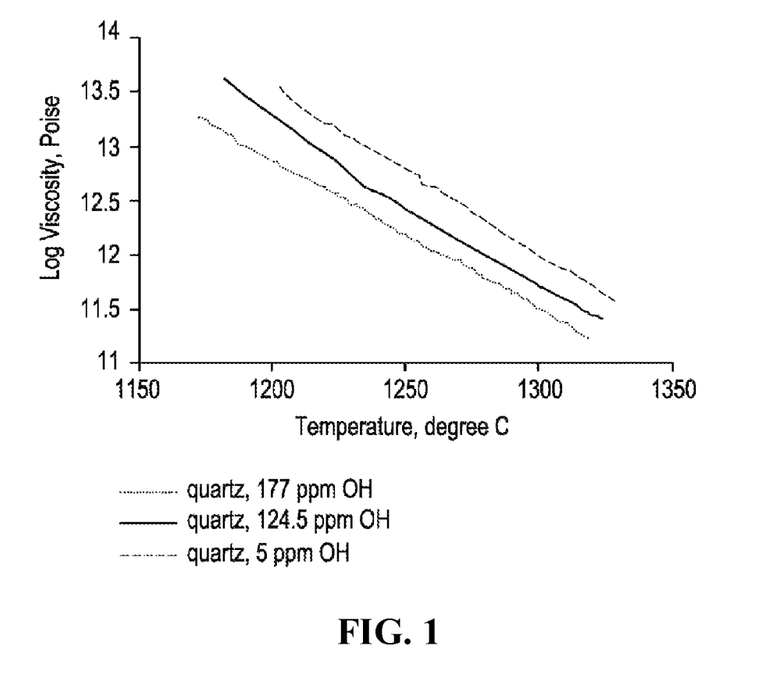
FIG. 1 is a graph illustrating the change in the viscosity of high purity quartz glass as a function of OH concentrations.

In glass applications such as liquid crystal panels, optical communication devices for instance optical filters and optical switches, recording medium, halogen, High Intensity Discharge (HID) lamps, etc. the consistency of the glass substrate properties is quite critical. High-energy laser systems employ multiple large pieces of optical quality glass, sometimes thousands of large size laser glass pieces, and it is imperative for the pieces to have consistent optical quality. Glass compositions, similarly to fused quartz compositions, are characterized by a few fundamental properties affecting the manufacturing of or the properties of products employing the compositions, i.e., viscosity, percent transmission, OH level to name a few. The effect of OH (hydroxyl) on viscosity of glass or quartz is widely known. FIG. 1, for instance, illustrates the viscosity curves of high purity quartz made with various OH concentrations. As seen from the Figure, viscosity of glass drastically drops with increased hydroxyl concentration. If glass or quartz has batch-to-batch or within-batch variations in the OH level, it will result in inconsistent manufacturability and product quality. From a lamp manufacturer's perspective, variations in the glass properties impact the yields of the high-speed lamp production lines, requiring undesirable and frequent adjustments made to the equipment to account for the variations in the glass properties.

Almost all arc discharge lamps and many high intensity filament lamps, such as tungsten-halogen lamps, emit ultra-violet (UV) radiation which may be harmful to human eyes and skin. As disclosed in U.S. Pat. Nos. 2,895,839; 3,148,300; 3,848,152; 4,307,315 and 4,361,779, lamps have been developed having a light source which emits both UV and visible light radiation enclosed within a vitreous envelope of fused quartz. U.S. Pat. Nos. 2,221,709; 5,569,979; 6,677,260 disclose fused quartz compositions containing UV-absorbing materials, or dopants as they are called, in the form of tubings or rods for use in making lamps, e.g., as lamp envelopes with properties to absorb UV radiation.

United States Patent Publication No. 2004/0063564A1 discloses a composition useful for forming glass substrates for use in information recording medium, with desirable properties such as specific linear thermal expansion coefficient, fracture toughness, and a predetermined surface hardness. In applications for making bulk glass articles such as fiberglass, it is also useful to have consistency in the glass compositions to obtain the desired ranges of properties such as viscosities, humidity resistance, and the like. United States Patent Publication No. 2002/0077243A1 discloses a composition for making glass fiber filters for use in micro-electronic clean room environments.

Due to the bulk volume of the feedstock making up the glass composition, there is a wide batch-to-batch variation in glass compositions as well as in the properties of products made from glass compositions of the prior art. It is important to have consistent properties in a glass composition such that products made thereof have properties that are uniform or varying in a narrow range. Additionally, the consistent properties allowing manufacturers to run production lines with minor or no adjustments in the line, for high productivity and consistently good glass products. The invention relates to a novel glass composition and a method for making glass products with uniform properties, as measured by the standard deviation.

In addition to the considerations above, various applications require specialized silica glass that possesses both a decreased brittleness when compared with various forms of typical silica glass, or even high silica glass, and a decreased density when compared to other silica, or high silica, glasses. While not wishing to be bound to any one use, a silica glass with reduced brittleness and reduced density would be useful in a wide range of applications where increased strength and reduced weight per unit volume of glass is desirable.

Given this, there is a need in the art for a silica glass that achieves an increase in strength while simultaneously achieving a reduction in brittleness thereby permitting such a glass to be used in a wide range of applications.

SUMMARY OF THE INVENTION

The invention relates to a silica glass compound having improved physical and chemical properties. In one embodiment, the present invention relates to a silica glass having a desirable brittleness in combination with a desirable density while still yielding a glass composition having a desired hardness and desired strength relative to other glasses. In still another embodiment, the present invention relates to a silica glass composition that contains at least about 85 mole percent silicon dioxide with the remainder of the glass compositions of the present invention being selected from one or more dopants and/or impurities. In still another embodiment, the present invention relates to a silica glass composition that contains at least about 85 mole percent silicon dioxide and up to about 15 mole percent of one or more dopants selected from F, B, N, Al, Ge, one or more alkali metals (e.g., Li, Na, K, etc.), one or more alkaline earth metals (e.g., Mg, Ca, Sr, Ba, etc.), one or more transition metals (e.g., Ti, Zn, Y, Zr, Hf, etc.), one or more lanthanides (e.g., Ce, etc.), or combinations of any two or more thereof.

In one embodiment, the present invention relates to a glass composition comprising a lot of glass articles, the glass composition containing 40 to 99 weight percent $SiO_2$, wherein the glass composition has a softening temperature ranging from 600° C. to 1650° C., and wherein the standard deviation of softening temperature measurements obtained from 10 or more randomly selected samples of glass articles produced from the lot is 10° C. or less.

In another embodiment, the present invention relates to a process for making a glass product comprising the steps of: (a) forming a first blend of about 0.02 to about 0.50 weight percent of a dispersant with about 1 to about 25 weight percent of a dopant selected from the metal oxide group of $Al_2O_3$, $TiO_2$, $CeO_2$, $Nd_2O_3$, $B_2O_3$, BaO, SrO, CaO, MgO, $Na_2O$, $K_2O$, $Li_2O$, $Sb_2O_3$, $Y_2O_3$, $Co_3O_4$, $Cu_2O$, $Cr_2O_3$ and mixtures of any two or more thereof, wherein the dispersant is a fumed metal oxide having a BET of about 50 to about 400 $m^2/g$ and a mean particle size of less than about 1 μm; (b) blending the first blend into about 92 to about 99 weight percent $SiO_2$ forming a quartz mixture; (c) producing a melt of molten glass from the mixture; and (d) passing the molten glass along a tool to form a glass product. In another embodiment, the glass product is in the form of a tubing, a rod, or a blank. In still another embodiment, the fumed metal oxide is selected from at least one of silica or a metal oxide already present in the dopant.

In still another embodiment, the present invention relates to a glass product comprising about 92 to about 99 weight percent of $SiO_2$, about 1 to about 8 weight percent of a dopant selected from $Al_2O_3$, $CeO_2$, $TiO_2$, $Nd_2O_3$, $B_2O_3$, BaO, SrO, CaO, MgO, $Na_2O$, $K_2O$, $Li_2O$, $Sb_2O_3$, $Y_2O_3$, $Co_3O_4$, $Cu_2O$, $Cr_2O_3$ and mixtures of any two or more thereof, and about 0.02 to about 0.50 weight percent of a fumed metal oxide having a BET of about 50 to about 400 $m^2/g$ and a mean particle size of less than about 1 μm, and wherein the fumed metal oxide is $SiO_2$ or a metal oxide present in the dopant, wherein the viscosity of a plurality of products prepared from the same batch exhibits a standard deviation of less than 10° C.

In still another embodiment, the present invention relates to a silica glass composition comprising: (i) at least about 85 mole percent silicon dioxide; and (ii) from 0.2 to about 15 mole percent of one or more dopants selected from F, B, N, Al, Ge, one or more alkali metals, one or more alkaline earth metals, one or more transition metals, one or more lanthanides, or combinations of any two or more thereof, wherein the silica glass composition optionally contains up to about 0.5 mole percent of one or more impurities selected from OH group concentration, halogen concentration, refractory metal concentration, or any combination of two or more thereof.

In still another embodiment, the present invention relates to a silica glass composition comprising: (a) at least about 85 mole percent silicon dioxide; and (b) from 0.2 to about 15 mole percent of one or more dopants selected from F, B, N, Al, Ge, one or more alkali metals, one or more alkaline earth metals, one or more transition metals, one or more lanthanides, or combinations of any two or more thereof, wherein the silica glass composition contains up to about 0.4 mole percent of one or more impurities selected from OH group concentration, halogen concentration, refractory metal concentration, or any combination of two or more thereof.

In still another embodiment, the present invention relates to a silica glass composition comprising: (I) at least about 85 mole percent silicon dioxide; and (II) from 0.2 to about 15 mole percent of one or more dopants selected from F, B, N, Al, Ge, one or more alkali metals, one or more alkaline earth metals, one or more transition metals, one or more lanthanides, or combinations of any two or more thereof, wherein the silica glass composition contains up to about 0.5 mole percent of two or more impurities selected from OH group concentration, halogen concentration, refractory metal concentration, or any combination of three or more thereof.

In another embodiment, the present invention relates to a silica glass composition as disclosed and described herein.

DETAILED DESCRIPTION OF THE INVENTION

The invention relates to a silica glass compound having improved physical and chemical properties. In one embodiment, the present invention relates to a silica glass having a desirable brittleness in combination with a desirable density while still yielding a glass composition having a desired hardness and desired strength relative to other glasses. In still another embodiment, the present invention relates to a silica glass composition that contains at least about 85 mole percent silicon dioxide with the remainder of the glass compositions of the present invention being selected from one or more dopants and/or impurities. In still another embodiment, the present invention relates to a silica glass composition that contains at least about 85 mole percent silicon dioxide and up to about 15 mole percent of one or more dopants selected from F, B, N, Al, Ge, one or more alkali metals (e.g., Li, Na, K, etc.), one or more alkaline earth metals (e.g., Mg, Ca, Sr, Ba, etc.), one or more transition metals (e.g., Ti, Zn, Y, Zr, Hf, etc.), one or more lanthanides (e.g., Ce, etc.), or combinations of any two or more thereof.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases.

As used herein, the term "functionalized" may be used interchangeably with "surface functionalized," "functionalized surface," "coated," "surface treated," or "treated," referring to the coating of the silica and dopant components with the dispersing agent of the invention. As used herein, "coating agent" is used interchangeably with "dispersing" agent.

Although the terms may be used to denote to compositions or articles of different materials (different silica concentrations), as used herein, the term "glass" may be used interchangeably with "quartz glass" or "quartz" or "fused quartz," referring to a composition, a part, a product, or an article formed by melting a mixture comprising natural or synthetic sand (silica). Either or both natural or synthetic sand (silica) can be used in the composition of the invention, and the term is used to denote compositions comprising either naturally occurring crystalline silica such as sand/rock, synthetically derived silicon dioxide (silica), or a mixture of both. The term "sand" may be used interchangeably with silica, denoting either natural sand or synthetic sand, or a mixture of both.

As used herein, the term "lot" when applied to a batch process for making the glass products of the invention, refers to glass articles made from a single batch of sand feed of at least 100 kg in total composition of sand and other additives. When applied to a continuous process of making glass products, the term lot refers to the glass articles having a total weight of at least 100 kg, as continuously produced from a process.

In one embodiment, the present invention relates a glass composition with minimum variations in the properties of articles formed from the same lot of the composition, e.g., fiberglass, tubings, rods, blanks, plates, etc., via the use of at least a dispersing/coating agent that helps the dopant(s) adhere to the sand grains. The dispersant maximizes the composition homogeneity within the same lot, such that the articles or parts manufactured from the same lot have minimum variations in properties such as viscosity, OH—, and the like. The articles made from the composition of the invention with minimum variations in properties can be subsequently melted, drawn, formed or tailored into a final glass product.

Sand Component: Depending on the final applications, the sand ($SiO_2$) feed can be either synthetic sand, natural sand, or a mixture thereof. In one embodiment, the amount of $SiO_2$ ranges from about 40 to about 75 weight percent. In a second embodiment, the amount ranges from about 70 to about 95 weight percent. In a third embodiment, the glass comprises a light-transmissive, vitreous composition with an $SiO_2$ content of at least about 90 weight percent. In a fourth embodiment of a quartz composition with a high melting point, at least about 95 weight percent $SiO_2$ is used. In a fifth embodiment, the amount of $SiO_2$ ranges from about 40 to about 99 weight percent.

Dispersing Agent Component: In one embodiment, the agent is a fumed metal oxide selected from the group of consisting of alumina, silica, titania, ceria, neodymium oxide, and mixtures thereof, having a BET value of about 50 $m^2/g$ to about 1000 $m^2/g$ and a particle size of less than about 25 microns. Fumed metal oxides are produced using processes known in the art, in one example, the hydrolysis of suitable feed stock vapor (such as silicon tetrachloride for fumed silica) in a flame of hydrogen and oxygen.

The surface area of the metal oxides may be measured by the nitrogen adsorption method of S. Brunauer, P. H. Emmet, and I. Teller, J. Am. Chemical Society, Volume 60, Page 309 (1938) and is commonly referred to as BET. In one embodiment, the dispersing agent has a BET of about 100 $m^2/g$ to about 400 $m^2/g$. In a second embodiment, the fumed metal oxide dispersing agent has a mean particle size of about 15 μm or less. In a third embodiment, the fumed metal oxide has a mean particle size of less than about 1.0 μm. In a fourth embodiment, the fumed metal oxide has a mean particle size of about 0.1 to about 0.5 μm with a BET value of about 50 $m^2/g$ to about 100 $m^2/g$.

The dispersing agent is added to the glass composition in an amount ranging from about 0.02 to about 0.50 weight percent (based on the total weight of the final glass composition). In one embodiment, dispersant is added to the sand mixture in an amount ranging from about 0.04 to about 0.30 weight percent. In a second embodiment, from about 0.05 to about 0.15 weight percent. In a third embodiment, from about 0.05 to about 0.10 weight percent.

In one embodiment, it is added directly to the glass composition along with the dopants. In a second embodiment, it is pre-mixed with at least one of the dopant(s) or a portion of the dopant(s), forming a master batch, which is subsequently added to the sand mixture. In a third embodiment, the dispersant is mixed with part or all of the selected dopant(s) forming a master batch, which master batch is subsequently added to the sand mixture and other dopants. In a fourth embodiment, the dispersant is mixed with all or some of selected dopants as well as some of the sand to form a master batch, which master batch is subsequently added to the final sand mixture.

In one embodiment, the dispersing agent is untreated fumed silica. In a second embodiment wherein $Al_2O_3$ is used as a dopant, the dispersing agent is fumed alumina. In a third embodiment wherein $CeO_2$ is added as a dopant, fumed ceria is used as a dispersing agent. In a fourth embodiment wherein one of the dopants used is $Nd_2O_3$, a mixture of fumed neodymium oxide and fumed silica is used as the dispersing agent. In yet another embodiment and regardless of the dopant(s) used, the dispersant is selected from fumed metal oxides with little adverse impact to the properties of the glass products, i.e., the group consisting of fumed alumina, silica, titania, ceria, neodymium oxide, and mixtures thereof.

Dopant Component(s): Depending on the end-use applications and the desired properties, e.g., high-intensity discharge lamps, tungsten-halogen lamps, automotive glazing, optical lenses, etc., a number of different dopants and mixtures thereof may be added to the base silicate or borosilicate glass. Examples of dopants include but not limited to metals, metal oxides, and alkali metal oxides known in the art, in an amount of about 0.1 to about 25 weight percent for each dopant.

In one embodiment, the dopants are be added to glass to change its color and transmission characteristics amongst other properties. In a second embodiment, the total amount of dopants is in the range of about 0.1 to about 10 weight percent. In a third embodiment, each of the dopant ranges from about 0.1 to about 8 weight percent. In a third embodiment, each of the dopant ranges from about 0.1 to about 5 weight percent.

In one embodiment, the dopant is neodymium oxide $Nd_2O_3$. Neodymium has been long-known as a coloring agent like the other rare-earth elements, it possesses an absorption spectra that extends over both the visible and invisible regions, transferring practically unchanged to base compounds, such as glasses. Neodymium absorbs light in the yellow region of the visible spectrum, between about 568 and 590 nm. As a result, light passing through neodymium containing glass accentuates the red and green tones in the surrounding environment. Furthermore, neodymium-containing glass provides an increase in visibility during foggy weather.

In a second embodiment, the dopant is a boron oxide $B_2O_3$. The amount of $B_2O_3$ may be carefully tailored to impart a sufficient low viscosity to the glass to effect easy melting thereof, but without raising the expansion of the glass. In a third embodiment, the dopant is an alkali oxide, e.g., $Na_2O$, $K_2O$, or $Al_2O_3$, or a mixture thereof, in a borosilicate composition ($SiO_2+B_2O_3$) for a glass with low expansion coefficients and lower softening temperature. In a fourth embodiment, the dopant is $CeO_2$ in an amount of about 0.1 to about 5 weight percent. Cerium is the only rare-earth element that absorbs UV radiation while exhibiting no absorption in the visible region of the spectrum. In yet a fifth embodiment, titanium or titanium oxide may be added, wherein the addition of titanium sometimes produces yellowish-brown glass. In a sixth embodiment, the dopant comprises europium oxide $Eu_2O_3$ by itself, or in combination with other dopants such as $TiO_2$ and $CeO_2$. In seventh embodiments, dopants such as CaO and/or magnesium oxide MgO may be added to give stability to the composition.

In one embodiment of a glass composition containing about 95 to about 99.9 weight percent $SiO_2$ and excluding the dispersing agent(s), dopants are added in an amount ranging from about 0.1 to about 5 weight percent $Al_2O_3$ and other impurities in an amount of not exceeding about 150 ppm (total). In a second embodiment, the composition comprises about 95 to about 99.9 weight percent $SiO_2$, about 0.1 to about 5 weight percent $Al_2O_3$ as a dopant, about 0.1 to about 400 ppm titanium (element), about 0.1 to about 4000 cerium (in elemental form or $CeO_2$), and other impurities not exceeding about 150 ppm (total). In a third embodiment, the composition comprises about 95 to about 99.9 weight percent $SiO_2$, about 0.1 to about 5 weight percent $Al_2O_3$ as a dopant, about 0.1 to about 400 ppm titanium (element), about 0.1 to about 4000 cerium (in elemental form or $CeO_2$), about 0.01 to about 2 weight percent $Nd_2O_3$, and other impurities not exceeding about 150 ppm (total).

In yet another embodiment and excluding the dispersing agent(s), the composition consists essentially of about 90.5 to about 95.7 weight percent $SiO_2$, about 2.8 to about 3.0 weight percent $B_2O_3$, about 0.7 to about 1.7 weight percent $Al_2O_3$, about 0.4 to about 4.5 weight percent $Nd_2O_3$, and about 0.1 to about 1 weight percent $CeO_2$, for use as envelopes for tungsten-halogen lamps and other high temperature lamps. In yet another embodiment for making halogen lamp envelopes, and excluding the dispersing agent, the composition consists essentially of about 55 to about 66 weight percent $SiO_2$, 0 to about 13 weight percent $B_2O_3$, about 14 to about 18 weight percent $Al_2O_3$, 0 to about 13 weight percent BaO, 0 to about 4 SrO, 0 to about 13 weight percent CaO, 0 to about 8 weight percent MgO, about 0.4 to about 4.5 weight percent $Nd_2O_3$, and about 0.1 to about 1 weight percent $CeO_2$. In another embodiment of a glass composition for sealed-beam incandescent headlights, the composition excluding the dispersing agent consists essentially of about 64 to about 85 weight percent $SiO_2$, about 11 to about 28 weight percent $B_2O$, about 0.5 to about 8.5 weight percent $Al_2O_3$, 0 to about 3.5 weight percent BaO, 0 to about 1.5 weight percent CaO, 0 to about 7.5 weight percent $Na_2O$, 0 to about 9.5 weight percent $K_2O$, 0 to about 1.5 weight percent $Li_2O$, 0 to about 1.5 weight percent $Sb_2O_3$, about 0.4 to about 4.5 weight percent $Nd_2O_3$, and about 0.1 to about 1 weight percent $CeO_2$.

In one embodiment for a glass composition for the absorption of red light in the range of 560 to 620 nm, and excluding the amount of added dispersant, the composition comprises about 95 to about 110 parts by weight $SiO_2$, about 0.5 to about 1.2 parts by weight $CeO_2$, about 0.5 to about 2.5 parts by weight of $Nd_2O_3$, about 0.1 to about 1 parts by weight of $Al_2O_3$, optionally about 0.001 to about 0.1 parts by weight of $Eu_2O_3$, about 0.001 to about 0.1 parts by weight of $TiO_2$, about 0.001 to about 0.5 parts by weight of BaO.

In one embodiment for a glass composition for making clean room HEPA and ULPA filters and excluding an amount of about 0.05 to about 0.10 weight percent of fumed silica as dispersants, the composition comprises less than about 1 weight percent boron; about 5.5 to about 18 weight percent barium oxide; about 10 to about 14.5 weight percent alkali oxide; about 4 to about 8 weight percent alumina; about 1 to about 9 weight percent alkaline earth oxide; about 2 to about 6 weight percent zinc oxide; about 0.1 to about 1.5 weight percent fluorine; and the balance silica. In yet another embodiment for a glass composition for glass components of lamps with excellent electrical insulation properties, excluding about 0.02 to about 0.50 weight percent of fumed alumina as a dispersant, the composition comprises about 55 to about 80 weight percent $SiO_2$; about 0.5 to about 5 weight percent $Al_2O_3$; 0 to about 5 weight percent $B_2O_3$; about 2 to about 15 weight percent $Na_2O$; 0 to about 5 weight percent $Li_2O$; and about 1 to about 15 weight percent $K_2O$, with the total content of $Na_2O$, $Li_2O$, and $K_2O$ falling within a range of about 3 to about 25 weight percent. In yet another glass composition for optical applications, e.g., graded index lenses, excluding about 0.02 to about 0.50 weight percent of fumed silica as a dispersant, the composition comprises about 40 to about 65 mole percent $SiO_2$; about 1 to about 10 mole percent $TiO_2$; up to about 22 mole percent MgO; about 2 to about 18 mole percent $Li_2O$; about 2 to about 20 mole percent $Na_2O$; and about 1 to about 15 mole percent of any of CaO, SrO and BaO.

Process for Making Glass Compositions/Products: The use of dispersants in the composition of the invention facilitates the blending of the dopants in the sand feed, and thus the homogeneity of glass products made. The composition can be made by via a batch method (one-at-a-time melting process) or a continuous melting method.

In one embodiment of a batch process, the glass products are made from batches of sand feed in the form of barrels or bags of sand, with each barrel or bag having a weight of at least about 100 lbs. In another embodiment, glass products are made from batches of at least about 100 kg of sand feed for each batch, with the sand being supplied in barrels of sizes of about 100 kg. In yet another embodiment, the sand is supplied in batches of about 300 lbs. for each bag or barrel, thus making glass articles out of single batches of at least about 300 lbs. each.

In one embodiment, the dispersing agent, i.e., the fumed metal oxide(s) such as fumed silica, fumed alumina, etc., is first mixed with about 20 to 100 percent of a single dopant, a few dopants, or all of the dopant(s), forming a master batch or concentrate. The fumed metal oxide dispersing agent can be the same or different metal oxide(s) as the dopant material(s). The mixing/blending may be conducted in a processing equipment known in the art, e.g., blenders, high intensity mixers, etc., for a sufficient amount of time for the dopants to be thoroughly coated with the dispersing agent. In one embodiment, a mixture of fumed silica as the dispersing agent is mixed with dopants such as $Al_2O_3$, $CeO_2$, $Nd_2O_3$, etc., in a Turbula™ mixer between 1 to 5 hours forming a master batch. While not wishing to be bound to any one theory, it is believed that the fumed silica acts as a sand grain "coating" agent and attracts smaller particles of dopant such as aluminum oxide, thus providing a more uniform mix.

In the next step, the master batch containing the coated dopant(s) is added to the natural/synthetic sand feed and the remainder of the uncoated dopants, if any, and mixed thoroughly in an equipment such as a tumbler, a sand muller, etc.

In one embodiment of the invention, the homogenous mix is calcined or heated at a temperature between about 500° C. to about 1500° C. for a sufficient period of time, e.g., for 0.5 to 4 hours to dry out the sand. The mixture is subsequently fused at a sufficiently high temperature to form glass products. The temperature depends on the glass composition, and in quartz compositions (having greater than about 95 percent $SiO_2$), the mixture is fused at a temperature of greater than about 2000° C. and ranging to about 2500° C., giving a vitreous material. In one embodiment, the mixture is continuously fed into a high temperature induction (electrical) furnace operating at temperatures in the range of about 1400° C. to about 2300° C., forming tubes and rods of various sizes. In another embodiment, the mixture is fed into a mold wherein flame fusion is used to melt the composition, and wherein the molten mixture is directed to a mold forming the glass particle.

In one embodiment wherein the glass product is in the form of continuous tube drawing, e.g., the tubings can be made by any process known in the art including the Danner process, the Vello process, a continuous draw process or modified processes thereof.

Glass Products from Composition of the Invention: Although not bound by theory, but it is believed that the dispersing agent in the form of fumed metal oxide with large surface areas functions as a mixing agent, helping the dopants stick or adhere to the sand grains, thus allowing a homogeneous mix and subsequently, glass products having very little variations in properties for products resulting from the same batch of sand. The glass products can be of an intermediate form of glass tubing, for use in manufacturing halogen lamb bulbs or water treatment lamps; solid glass rods or performs for making lamp envelopes; blanks, glass plates or sheets for automotive glazing. The glass products can be of a final bulk form such as glass fiber.

In one embodiment, the tubings have sizes ranging from about 1 to about 500 mm outside diameter (OD), with a thickness ranging from about 1 to about 20 mm depending on the size of the tubing. The length of the tubings ranges from about 24 inches to about 60 inches for tubings with OD of less than about 100 mm and about 24 inches to about 96 inches for tubings with OD of greater than about 100 mm.

In another embodiment of making glass preforms or rods using processes known in the art, including a continuous draw process of at least two steps. In the first step, an elongated, consolidated preform having an aperture is drawn to a reduced diameter preform. The second step involves drawing the reduced diameter preform into a rod at a lower temperature than the first step to reduce the formation of inclusions in the glass rod during drawing. In one example, the rods have OD ranges from about 0.5 mm to about 50 mm. In one embodiment, the rods are made in a draw process In one embodiment of a continuous process, e.g., making glass plates for use in automotive applications, after the raw materials are admixed and melted, the melt is feed to a conventional float glass furnace and subsequently into a molding forming the final product.

Uniform Properties of Glass Products: In one embodiment, the glass products of the invention are characterized as having uniform properties for glass articles produced from the same lot, i.e., articles or pieces produced from the same mixing batch with each batch employing a minimum size of at least 100 kg of sand, or glass articles continuously produced from a continuous process with a total weight of at least about 100 kg.

Uniform properties means little variations in the properties of the glass pieces or products from the same lot are measured. The properties range from chemical properties such as OH level to physical properties such as viscosity, transmission, strength, and color measurement, softening point, annealing point, etc.; thermal properties such as coefficient of thermal expansion; mechanical properties such as compressive strength, etc. As used herein a plurality of products means at least 10 samples, randomly selected from products/pieces made from the same lot.

Melting temperature, softening temperature, strain temperature, and annealing temperature respectively vary according to the glass composition, i.e., ranging from as low as about 600° C. as softening point for lead borate glass to about 1650° C. for fused silica. The glass articles of the invention have different working temperatures depending on the amount of silica present in the composition. However, they are all characterized as varying little in the melting temperature, softening temperature, strain temperature, and annealing temperature for glass articles made from the same lot. In one embodiment, the glass articles made from the same lot have a standard deviation σ of less than 10° C. in their melting point, softening point, bending point, and annealing point respectively, as measured from 10 or more randomly selected samples of glass articles produced from the same lot. In a second embodiment, the standard deviation is less than 5° C. variation in the melting, softening, bending, and annealing temperatures respectively, from measuring at least 10 randomly selected samples.

In one embodiment, glass articles made from the same lot have an average annealing temperature in the range of about 1000° C. to about 1250° C. (corresponding to a log viscosity of 13.18 Poise), with a standard deviation σ of less than 10° C. In a second embodiment, the glass articles have a standard deviation σ of less than 5° C. for articles made from the same lot.

In one embodiment, the glass articles produced from the same lot have a standard deviation σ of 10 ppm in terms of the average OH concentration. In one embodiment, the glass articles have an average OH concentration of less than 100 ppm, with a standard deviation σ of less than 10 ppm. In another embodiment, the glass has an average OH concentration of less than about 50 ppm, with a value of less than 5 ppm for glass articles from the same batch. In yet another embodiment, glass articles from the same lot have an average OH concentration of less than about 30 ppm, with a value of less than 5 ppm. In a fourth embodiment, glass articles from the same lot have an average OH concentration of less than about 20 ppm, with a value of less than 3 ppm.

Glass articles made from the compositions of the invention are also characterized as having excellent dimensional control/stability, e.g., with little variations in the dimensions of the finished articles made from the same mold and out of the same lot. Generally, the dimensional accuracy (moldability) of a glass product can be accurately judged by process capability (Cpk). Here, "process capability" indicates the degree of quality that is achieved when the process is standardized, and causes for abnormality are removed, whereby the process is kept in a stable condition. In one embodiment, dimensions of glass articles are measured using a micrometer and calipers for at least three dimensions, length, thickness, and width for glass articles in the form of a plate. In a second embodiment, dimensions along the line of length, thickness (of a tubing) and diameter are measured. In one embodiment, the glass articles of the invention are characterized as having a Cpk (process capability index) of greater than 1.50 in all three quantified dimensions. In a second embodiment, the glass articles have a Cpk of greater than 1.33 for articles made from the same lot. In yet another embodiment, the glass articles are measured in terms of their outer diameter, wall thickness, and ovality (variation in the outer diameter around the circumference), and wherein the articles have a CpK of greater than 1.33 for articles from the same lot.

In one embodiment the glass articles as produced from the same lot of the invention have an average coefficient of thermal expansion from 25° C. to 320° C. of $0.54*10^6$/K to $5.5*10^{-7}$/K with a standard deviation σ of less than $0.5*10^{-7}$/K. In one embodiment, the glass articles have an average coefficient of thermal expansion from 25° C. to 320° C. of less than $7.0*10^{-7}$/K, with a standard deviation σ of less than $7*10^{-8}$/K.

In one embodiment, the glass articles made from the same lot of the present invention have a refractive index ranging from about 1.40 to about 1.68, with a standard deviation for glass articles made from the same lot of less than 0.001. In one embodiment, the glass articles have a refractive index ranging from about 1.450 to about 1.480 with a standard deviation of less than 0.0001 for glass articles made from the same lot.

In one embodiment, the glass articles of the invention comprising about 95 to about 99.995 weight percent of high purity silicon dioxide display a visible transmission of above about 90 percent in the 400 to 800 nm wavelength range, with a standard deviation of less than 2 percent for glass articles produced from the same lot. In a second embodiment, the glass articles display a visible transmission of above 90 percent in the 400 to 800 nm wavelength range and a standard deviation of less than 0.5 percent for glass articles produced from the same lot.

Applications and Articles Employing Glass Products: In one embodiment, the molten glass composition is molded/formed into a final product such as glass plates or containers. In another embodiment for use in lamp products, e.g., lamp envelopes of tungsten-halogen lamp systems or lamp sleeves for tungsten-halogen lamps and other high temperature lighting devices ("high intensity discharge lamps"), the molten glass composition is made into intermediate glass products such as rods or tubings prior to being formed into the final glass application as lamp envelopes or sleeves.

In one embodiment, the composition is used in applications where high contrast and enhanced visible properties of transmitted or reflected visible light can be a benefit. Such uses include, for example, ophthalmic glass for eyewear, such as sunglasses, or as glass hosts for lasers. In yet another embodiment, the glass can be made into computer screens with enhanced contrast properties can lessen visual discomfort, or rear-view mirrors to reduce glare. The glass products with uniform properties of the invention can also be used in applications such as containers for medical, chemical, and pharmaceutical products such as ampoules, bottles, reagent containers, test tubes, titration cylinders and the like. In another embodiment, the product is used in applications such as automotive glazing. The glass composition can also be used in bulk glass products such as fiberglass.

EXAMPLES

Examples are provided herein to illustrate the invention but are not intended to limit the scope of the invention.

In the examples, fumed silica is commercially available from Matteson-Ridolfi Inc. as Cab-O—Sil M5, with a B.E.T. surface area of 200 m²/g and average particle (aggregate) size of 0.2 to 0.3 µm. The sand used is a natural sand having a purity level of at least 99.99 percent, which is commercially available from a number of sources.

Example 1

A glass composition is made with 96 weight percent high purity silicon dioxide, 4 weight percent $Al_2O_3$ as a dopant, and with other impurities kept at below 150 ppm. The $Al_2O_3$ dopant is first coated with 0.08 weight percent of fumed silica prior to being mixed into the batch of $SiO_2$. The composition is then fused in a high induction furnace at 2000° C., forming quartz tubings (labeled as LSPG 1 in subsequent examples).

Example 2

A UV-blocking glass composition is made with 96 weight percent high purity silicon dioxide, 4 weight percent $Al_2O_3$, 200 ppm of titanium, and 500 ppm of $CeO_2$, with other impurities kept at below 150 ppm. The $Al_2O_3$, titanium, $CeO_2$ dopant mixture is first coated with 0.05 weight percent of fumed silica prior to being mixed into the batch of $SiO_2$. The composition is then fused in a high induction furnace at 2000.degree. C., forming quartz tubings (labeled as LSPG 2 in subsequent examples).

Example 3

Random samples from sections of fused quartz tubings made from the quartz glass composition LSPG1 of Example 1 were measured for OH concentration (in ppm). Random samples were also obtained from commercially available fused quartz glass tubings sold as Vycor™ 7907, Vycor™ 7913, and Vycor™ 7921 from Corning Incorporated of Corning, N.Y. and measured for OH concentration. Standard deviations were measured and the results are as follows in Table 1.

TABLE 1

|  | Example 1 Tubing | Vycor 7907 Tubing | Vycor 7913 Tubing | Vycor 7921 Tubing |
| --- | --- | --- | --- | --- |
|  | 39.15 | 241.56 | 124.46 | 118.83 |
|  | 39.82 | 277.49 | 153.54 | 123.66 |
|  | 36.66 | 267.46 | 110.11 | 105.43 |
|  | 36.09 | 267.21 | 130.27 | 89.35 |
|  | 36.14 | 251.51 | 116.89 | 119.28 |
|  | 36.21 | 268.57 | 212.04 | 122.62 |
|  |  |  | 224.87 |  |
|  |  |  | 224.38 |  |
|  |  |  | 210.58 |  |
|  |  |  | 91.48 |  |
|  |  |  | 83.6 |  |
|  |  |  | 77.07 |  |
|  |  |  | 66.99 |  |
|  |  |  | 90.45 |  |
| Average OH | 37.345 | 262.300 | 136.909 | 113.195 |
| Standard Deviation | 1.683 | 13.171 | 57.905 | 13.387 |

Example 4

Figure 2:
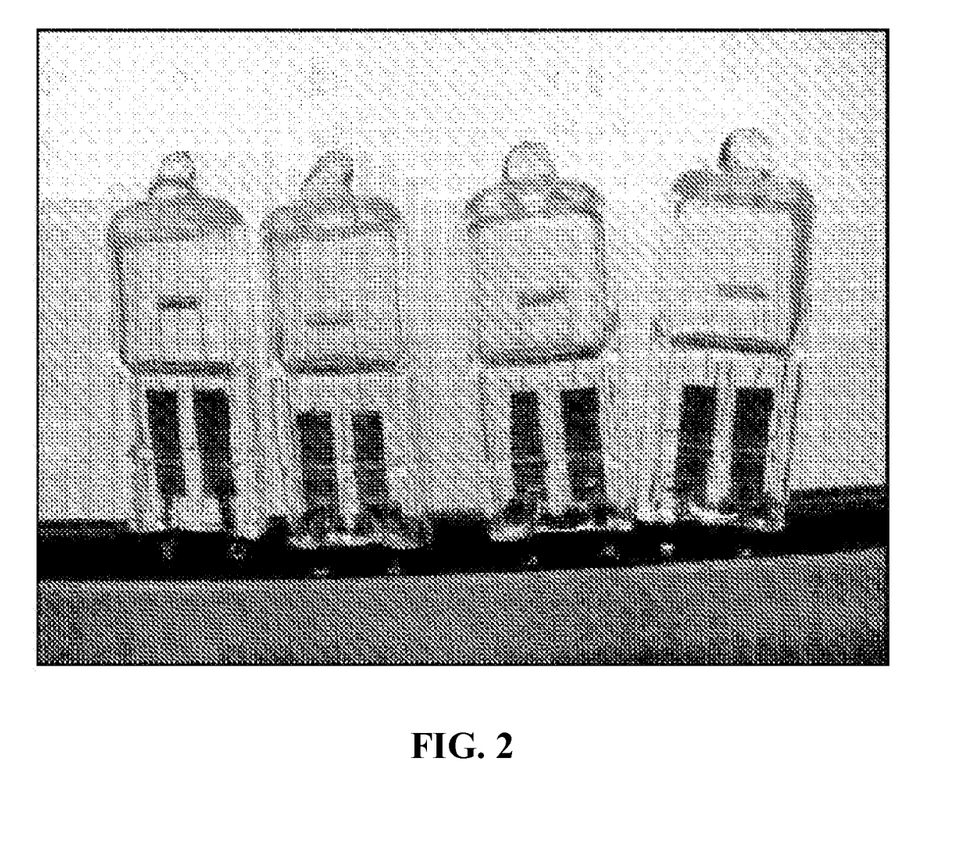
FIG. 2 is a photograph comparing lamp envelopes made from the glass composition in one embodiment of the invention, i.e., 2 wire lamps on the right versus 2 lamp envelopes made from a glass composition in the prior art (lamps on the left)

Lamp envelopes were made out of randomly selected fused quartz tubings made from the composition LSPG 1 of Example 1 and the Vycor™ 7913 tubings. No adjustments were made to the lamp manufacturing line to account for the differences in the physical and chemical properties of the tubings. FIG. 2 is a photograph comparing the lamps made from the quartz composition of the invention (two lamps on the right hand side) and lamps made from the composition of the prior art (two lamps on the left side of the picture), showing deformity in the two lamps made from a composition of the prior art.

Example 5

Figure 3:
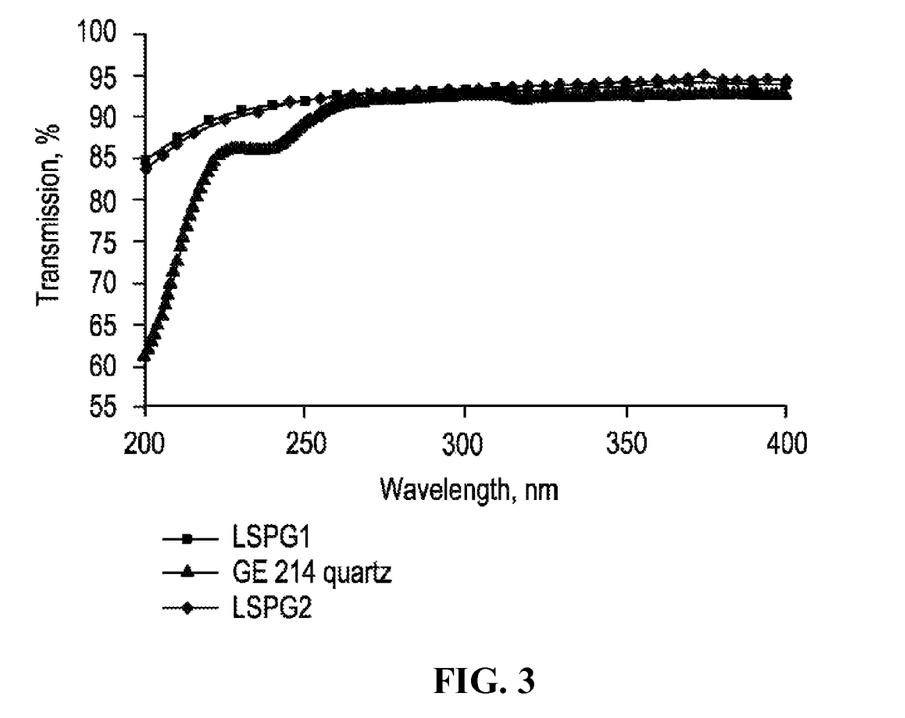
FIG. 3 is a graph comparing the variations in UV transmission data for samples from the glass products of the invention as made from the same lot versus samples from glass products made from a composition in the prior art.

UV transmittance data between 200 to 400 nm were measured for samples of quartz tubings made from: a) compositions LSPG1 and LSPG2 of Examples 1-2; b) commercially available GE214 natural quartz from GE Quartz, Inc. of Ohio, FIG. 3 is a graph comparing the UV transmission data, showing that the quartz glass products of the invention as made from the same batch have a much narrower UV transmission variation band compared to a quartz glass composition of the prior art (GE214 quartz).

Also as illustrated, the quart glass products of the invention absorb at least 90 percent of UV radiation between 250 to 400 nm, and at least 87 percent of the UV radiation between 200 to 400 nm. Although not measured/illustrated in FIG. 3, it is noted that publicly available transmission data for Vycor 7913 shows a significant jump from less than 5 percent to about 90 percent from 200 to 300 nm for Vycor 7913, as compared to a narrow variation of less than 10 percent for the compositions of the invention in the range of 200 to 300 nm.

Example 6

Figure 4:
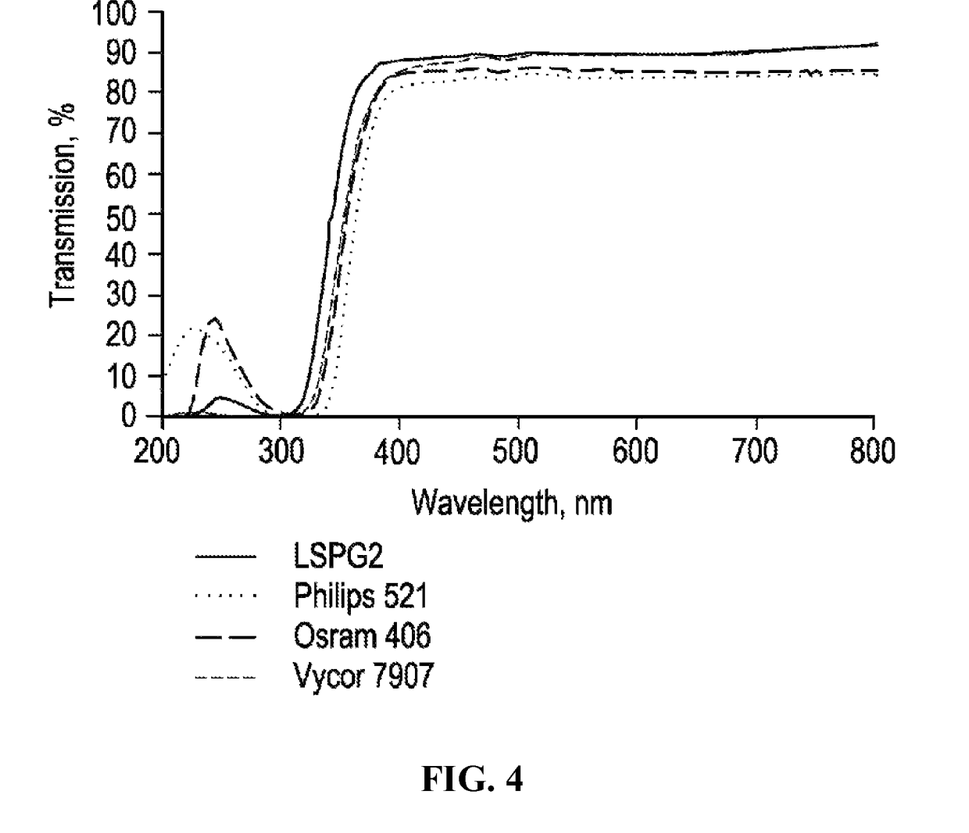
FIG. 4 is a graph comparing the variations in UV transmission data over a range of 200 to 800 nm, for samples from the glass products of the invention as made from the same lot versus samples from commercially available glass products in the prior art.

UV transmittance data between 200 to 800 nm were measured for samples of quartz tubings made from composition LSPG2 of Example 2 and commercially available products including Osram 406, Philips 521, and Vycor 7907. FIG. 4 is a graph comparing the UV transmission data for the various samples. As noted, the transmission data for the sample of the invention shows little variation in the 200 to 300 nm range compared to the samples of the prior art.

Example 7

Figure 5:
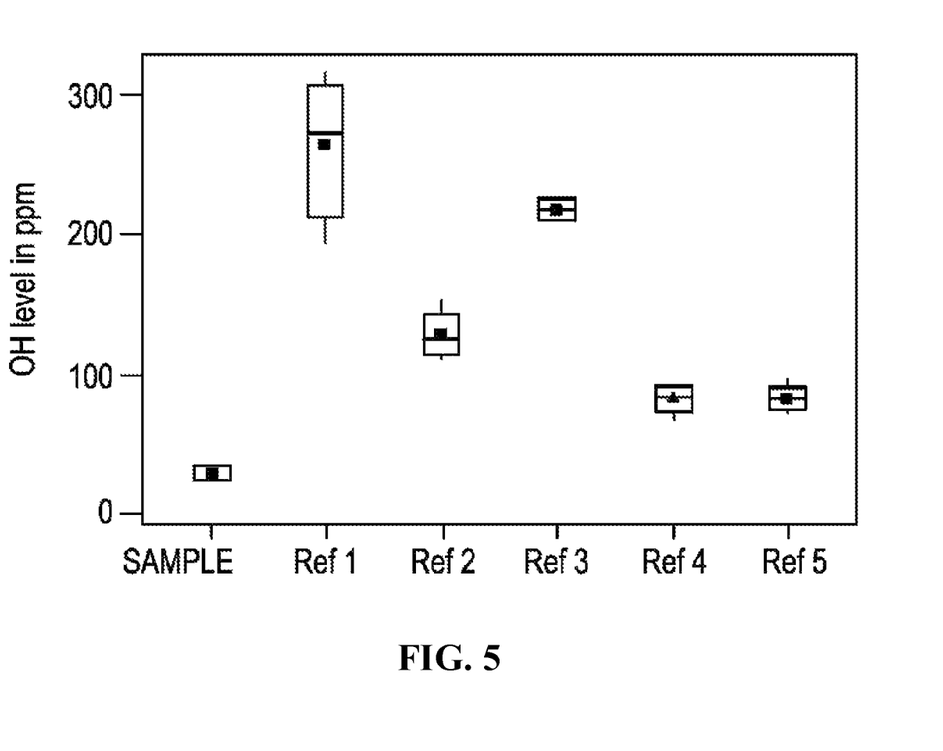
FIG. 5 is a graph comparing the average OH concentration and standard deviation of an embodiment of the glass composition of the invention vs. reference samples from commercially available glass products in the prior art.

OH concentrations were measured for samples of quartz tubings made from composition LSPG2 of Example 2 and commercially available products including Osram 406, Philips 521, Vycor 7907, and Philips low viscosity glass. FIG. 5 is a graph comparing the OH concentration in ppm for the composition Example 2 versus the various prior art glass samples (commercially available glasses indicated as reference samples 1-5). As shown in the Figure, the sample of the invention has a much lower average OH level and standard deviation compared to the samples of the prior art.

Example 8

Figure 6:
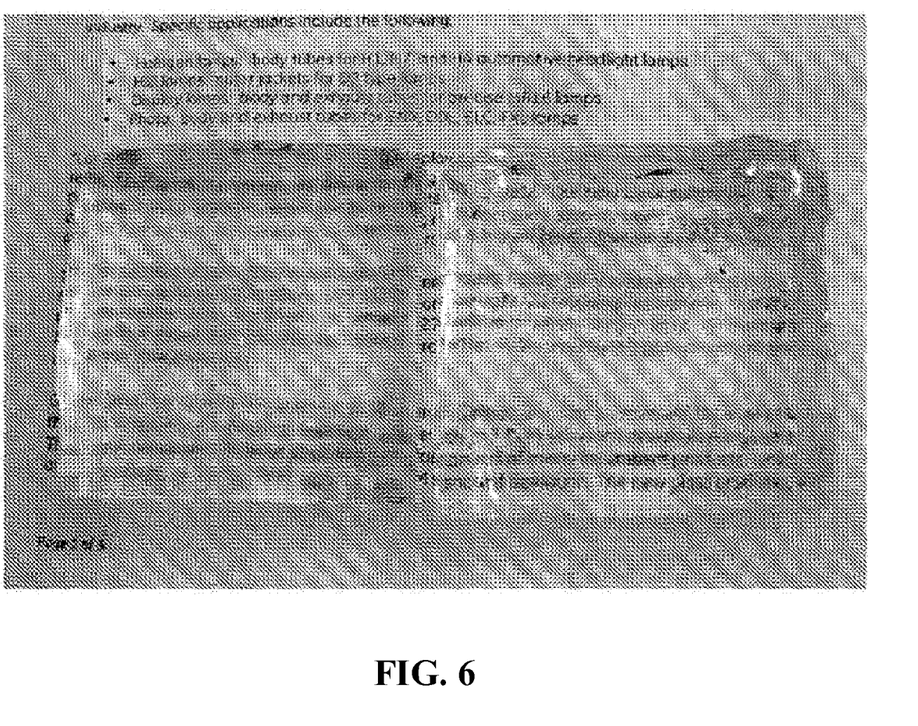
FIG. 6 is a photograph comparing a glass "puck" made from the glass composition in one embodiment of the invention versus a glass puck made from a glass composition in the prior art, particularly with respect to degree of clarity (or transmission through the glass)

Glass pucks having dimensions of 4 inches by 4 inches by 1 inches' (in thickness) are fused from: 1) comparative glass composition containing 96 wt. % high purity silicon dioxide, 4 weight percent $Al_2O_3$ as a dopant, and with other impurities kept at below 150 ppm; and 2) a composition of the invention, LSPG1 composition of Example 1 with 0.08 weight percent of fumed silica. FIG. 6 is a photograph comparing the two glass pucks side by side, comparative glass puck on the left of the picture and the LSPG1 glass puck on the right. As shown, the glass on the right has a greater degree of clarity (or transmission through the glass) compared to the glass on the left, with the letters underneath the LSPG1 puck on the right appear to be more clear/easier to read.

Additional Embodiments

Additionally, in another embodiment, the present invention is directed to a silica glass composition that comprises from about 0.1 mole percent to about 15 mole percent of one or more dopants selected from F, B, N, Al, Ge, one or more alkali metals (e.g., Li, Na, K, etc.), one or more alkaline earth metals (e.g., Mg, Ca, Sr, Ba, etc.), one or more transition metals (e.g., Ti, Zn, Y, Zr, Hf, etc.), one or more lanthanides (e.g., Ce, etc.), or combinations of any two or more thereof. Various chemical compounds can be utilized to supply the dopant portion of the present invention including, but not limited to, oxide compounds, carbonates, sulfates, sulfites, nitrides, nitrate compounds or nitrite compounds of any one or more of the above-mentioned dopant elements. In one embodiment, two or more dopants are selected from those listed above.

In one embodiment, the silica glass compositions of the present invention comprises at least about 85 mole percent silicon dioxide, with the remainder of the glass compositions of the present invention being selected from one or more dopants and/or impurities. In another embodiment, the silica glass compositions of the present invention comprise at least 87.5 mole percent silicon dioxide, at least 90 mole percent silicon dioxide, at least 92.5 mole percent silicon dioxide, at least 95 mole percent silicon dioxide, at least 97.5 mole percent silicon dioxide, at least 98 mole percent silicon dioxide, at least 98.5 mole percent silicon dioxide, at least 99 mole percent silicon dioxide, at least 99.5 mole percent silicon dioxide, or even at most 99.9 mole percent silicon dioxide, with the remainder of the glass compositions of the present invention being selected from one or more dopants and/or impurities. Here, as well as elsewhere in the specification and claims, individual range limits can be combined to form additional non-disclosed, or non-specified, ranges.

In another embodiment, the silica glass compositions of the present invention comprise at least 87.5 mole percent silicon dioxide, at least 90 mole percent silicon dioxide, at least 92.5 mole percent silicon dioxide, at least 95 mole percent silicon dioxide, at least 97.5 mole percent silicon dioxide, at least 98 mole percent silicon dioxide, at least 98.5 mole percent silicon dioxide, at least 99 mole percent silicon dioxide, at least 99.5 mole percent silicon dioxide, or even at most 99.9 mole percent silicon dioxide, with the remainder of the glass compositions of the present invention being selected from one or more dopants. Here, as well as elsewhere in the specification and claims, individual range limits can be combined to form additional non-disclosed, or non-specified, ranges.

In one embodiment, the amount of dopant in the silica glass composition of the present invention is in the range of about 0.2 mole percent to about 15 mole percent, or from about 0.25 mole percent to about 12.5 mole percent, or from about 0.5 mole percent to about 11.5 mole percent, or from about 0.75 mole percent to about 10 mole percent, or from about 1 mole percent to about 9 mole percent, or from about 1.5 mole percent to about 8.5 mole percent, or from about 2 mole percent to about 8 mole percent, or from about 2.5 mole percent to about 7.5 mole percent, or from about 3 mole percent to about 7 mole percent, or from about 3.5 mole percent to about 6.5 mole percent, or from about 4 mole percent to about 6 mole percent, or even from about 4.5 mole percent to about 5.5 mole percent. Here, as well as elsewhere in the specification and claims, individual range limits can be combined to form additional non-disclosed, or non-specified, ranges.

In one embodiment, the brittleness of the silica glass compositions of the present invention are designed to yield a silica glass having a brittleness that is lower than about $9\ \mu m^{-1/2}$, or even less than about $7.5\ \mu m^{-1/2}$, while in one embodiment, simultaneously having a desirable density as defined below. In another embodiment, the brittleness of the silica glass compositions of the present invention are designed to yield a silica glass having a brittleness that is in the range of about 4 $\mu m^{-1/2}$ to about $9\ \mu m^{-1/2}$, or from about $5\ \mu m^{-1/2}$ to about 8 $\mu m^{-1/2}$, or even from about $6\ \mu m^{-1/2}$ to about $7\ \mu m^{-1/2}$, while simultaneously having a desirable density as defined below. Here, as well as elsewhere in the specification and claims, individual range limits can be combined to form additional non-disclosed, or non-specified, ranges.

In one embodiment, the silica glass compositions of the present invention have improvements to one or more of properties selected from impact resistance, reduction in damage zone, impact energy dissipation, cracking, surface defects, etc. In still another embodiment, the silica glass compositions of the present invention possess one or more desirable properties selected from a desirable viscosity, transmission properties relative to various wavelengths of energy, or even ranges of wavelengths, (e.g., visible light, UV, infrared, etc.), low OH group concentrations, low chlorine content, etc.

In one embodiment, the silica glass compositions of the present invention have a hardness of between about 350 HV and about 1300 HV, or between about 400 HV and about 1250 HV, or between about 500 HV and about 1200 HV, or between about 600 HV and about 1150 HV, or between about 700 HV and about 1100 HV, or between about 750 HV and about 1050 HV, or between about 800 HV and about 1000 HV, or between about 850 HV and about 950 HV, or even about 900 HV. Here, as well as elsewhere in the specification and claims, individual range limits can be combined to form additional non-disclosed, or non-specified, ranges.

In one embodiment, the density of the silica glass compositions of the present invention are less than about 2.5 g/cc, or less than about 2.4 g/cc, or less than about 2.3 g/cc, or even less than about 2.2 g/cc. In another embodiment, the density of the silica glass compositions of the present invention are in the range of about 2.1 g/cc to about 2.5 g/cc, or from about 2.15 g/cc to about 2.45 g/cc, or from about 2.2 g/cc to about 2.4 g/cc, or from about 2.25 g/cc to about 2.35 g/cc, or even about 2.3 g/cc. Here, as well as elsewhere in the specification and claims, individual numerical values can be combined to form additional non-disclosed, or non-specified, ranges.

In one embodiment, the one or more dopants of the present invention are added to the raw materials utilized to produce the silica glass of the present invention prior to the melting process. In another embodiment, the one or more dopants of the present invention can be added at any time after the base silica material is melted to form the raw silica glass composition. In this instance, the dopants are mixed into the molten silica glass by any appropriate method.

In still another embodiment, the silica glass compositions of the present invention possess low concentrations of OH groups and/or one or more halogens. In one embodiment, the concentration of OH groups in the silica glass compositions of the present invention are less than about 1.0 mole percent, or less than about 0.9 mole percent, or less than about 0.8 mole percent, or less than about 0.7 mole percent, or less than about 0.6 mole percent, or less than about 0.5 mole percent, or less than about 0.4 mole percent, or less than about 0.3 mole percent, or less than about 0.2 mole percent, or less than about 0.1 mole percent, or less than about 0.05 mole percent, or even less than about 0.01 mole percent. Here, as well as elsewhere in the specification and claims, individual numerical values can be combined to form additional non-disclosed, or non-specified, ranges.

In another embodiment, the concentration of any one or more OH groups in the silica glass compositions of the present invention are less than about 1000 ppm, less than about 750 ppm, less than about 500 ppm, less than about 400 ppm, less than about 300 ppm, less than about 250 ppm, less than about 100 ppm, less than about 50 ppm, less than about 25 ppm, less than about 12.5 ppm, less than about 10 ppm, less than about 7.5 ppm, less than about 5 ppm, less than about 2.5 ppm, less than about 1 ppm, or even less than about 0.5 ppm. Here, as well as elsewhere in the specification and claims, individual numerical values can be combined to form additional non-disclosed, or non-specified, ranges.

In one embodiment, the concentration of any one or more halogens (e.g., chlorine, fluorine, bromine, and/or iodine) in the silica glass compositions of the present invention are less than about 1.0 mole percent, or less than about 0.9 mole percent, or less than about 0.8 mole percent, or less than about 0.7 mole percent, or less than about 0.6 mole percent, or less than about 0.5 mole percent, or less than about 0.4 mole percent, or less than about 0.3 mole percent, or less than about 0.2 mole percent, or less than about 0.1 mole percent, or less than about 0.05 mole percent, or even less than about 0.01 mole percent. Here, as well as elsewhere in the specification and claims, individual numerical values can be combined to form additional non-disclosed, or non-specified, ranges.

In another embodiment, the concentration of any one or more halogens (e.g., chlorine, fluorine, bromine, and/or iodine) in the silica glass compositions of the present invention are less than about 3000 ppm, less than about 2500 ppm. Less than about 2000 ppm, less than about 1500 ppm, less than about 1250 ppm, 1000 ppm, less than about 750 ppm, less than about 500 ppm, less than about 400 ppm, less than about 300 ppm, less than about 250 ppm, less than about 100 ppm, less than about 50 ppm, less than about 25 ppm, less than about 12.5 ppm, less than about 10 ppm, less than about 7.5 ppm, or even less than about 5 ppm. Here, as well as elsewhere in the specification and claims, individual numerical values can be combined to form additional non-disclosed, or non-specified, ranges.

In still another embodiment, the silica glass compositions of the present invention possess low concentrations of refractory metals from the melting process by which the silica glass compositions of the present invention are formed in combination with one or more of a low halogen concentration and/or a low OH group concentration. Exemplary refractory metals fall within this category include, but are not limited to, molybdenum and platinum, tungsten, tantalum, etc., or mixtures of two or more thereof. In one embodiment, the concentration of the one or more refractory metals from melting in the silica glass compositions of the present invention are less than about 1.0 mole percent, or less than about 0.9 mole percent, or less than about 0.8 mole percent, or less than about 0.7 mole percent, or less than about 0.6 mole percent, or less than about 0.5 mole percent, or less than about 0.4 mole percent, or less than about 0.3 mole percent, or less than about 0.2 mole percent, or less than about 0.1 mole percent, or less than about 0.05 mole percent, or even less than about 0.01 mole percent. Here, as well as elsewhere in the specification and claims, individual numerical values can be combined to form additional non-disclosed, or non-specified, ranges.

In another embodiment, the concentration of the one or more refractory metals from melting in the silica glass compositions of the present invention are less than about 1000 ppm, less than about 750 ppm, less than about 500 ppm, less than about 400 ppm, less than about 300 ppm, less than about 250 ppm, less than about 100 ppm, less than about 50 ppm, less than about 25 ppm, less than about 12.5 ppm, less than about 10 ppm, less than about 7.5 ppm, or even less than about 5 ppm. Here, as well as elsewhere in the specification and claims, individual numerical values can be combined to form additional non-disclosed, or non-specified, ranges.

In still yet another embodiment, the silica glass compositions of the present invention have an improved transmission range from about 180 nm to 4000 nm and increased resistance to ballistic damage. In another embodiment, the silica glass compositions of the present invention can have tailored visual transmission and/or visual blocking properties due to the inclusion of one or more of the dopants discussed above.

In still yet another embodiment, the silica glass compositions of the present invention comprise one or more dopants at a level of less than about 15 mole percent while simultaneously possessing at least a desirable hardness, a desirable density, a low halogen concentration and/or a low OH group concentration.

In one embodiment, the property set of the silica glass compositions of the present invention are considered to be between known normal glass compositions and known anomalous glass compositions. In another embodiment, the silica glass compositions of the present invention are electric fusion glass compositions having low OH group concentrations therein, low halogen concentrations therein, and/or suitable densities so as to be considered very high viscosity glasses (or even refractory glasses). Once a piece of glass is made in accordance with the formulations disclosed herein, such glass can be processed further by any known glass processing meted including, but not limited to, polishing, annealing, ion exchange, coated or coatings, laminated, etc.

In another embodiment, the silica glasses of the present invention have a homogeneity due to the manner by which they are formed. Suitable methods of manufacture are known to those of skill in the art that can achieve the desired homogeneity (e.g., lack of striae, uniform and consistent refractive index, uniform and consistent color, and/or consistent density). In another embodiment, the silica glasses of the present invention have a heterogeneity due to the manner by which they are formed (e.g., phase separated and/or compositional uniformity) Regarding compositional uniformity, in the case of such heterogeneous compositions centers of compositionally distinct regions can be separated by length scales of about 500 microns or less, about 400 microns or less, about 300 microns or less, about 250 microns or less, about 100 microns or less, about 50 microns or less, about 10 microns or less, about 5 microns or less, about 1 micron or less, or even about 0.1 microns or less (i.e., 100 nanometers). Regarding compositional uniformity, in another embodiment in the case of heterogeneous compositions of the present invention the centers of compositionally distinct regions can be separated by length scales of about 5 millimeters or less, about 4 millimeters or less, about 3 millimeters or less, about 2.50 millimeters or less, or even about 1 millimeters or less. Here, as well as elsewhere in the specification and claims, individual numerical values can be combined to form additional non-disclosed, or non-specified, ranges.

In still another embodiment, the silica glass compositions of the present invention can possess in combination with any one or more of the other chemical and/or mechanical properties described above a fracture toughness of about 0.5 to about 1 mega Newtons per meter squared, or from about 0.6 to about 0.9 mega Newtons per meter squared, or even from about 0.7 to about 0.8 mega Newtons per meter squared. Here, as well as elsewhere in the specification and claims, individual numerical values can be combined to form additional non-disclosed, or non-specified, ranges.

In still another embodiment, the silica glass compositions of the present invention can possess in combination with any one or more of the other chemical and/or mechanical properties described above a melting temperature ($T_m$) of at least about 1500° C., at least about 1550° C., at least about 1600° C., at least about 1650° C., at least about 1700° C., at least about 1750° C., at least about 1800° C., or even at least about 1850° C. Here, as well as elsewhere in the specification and claims, individual numerical values can be combined to form additional non-disclosed, or non-specified, ranges. In still another embodiment, the silica glass compositions of the present invention have an annealing temperature ($T_A$) of at least about 650° C., at least about 850° C., at least about 1050° C., or even at least about 1200° C. Here, as well as elsewhere in the specification and claims, individual numerical values can be combined to form additional non-disclosed, or non-specified, ranges.

In another embodiment, the present invention relates to silica glass compositions that possess scratch and/or abrasion resistance, chemical durability, impact resistance, blast resistance, thermal resistance, thermal shock resistance, are machinable, possess ballistic impact resistance (both single shot and multi hit resistance).

As used herein, an exemplary definition of brittleness (B) comes from J. Sehgal and S. Ito, J. of Non Cryst. Solids 253 (1999) 126 and also R. J. Hand and D. R. Tadjiev J. of Non Cryst. Solids 356 (2010) 2417, where B=Hv/Kc and Hv is the Vickers hardness and Kc is the fracture toughness. Additionally, the glass compositions of the present invention can be homogenous or heterogeneous. The definitions of these terms are known to those of skill in the art. Normal and anomalous glasses can be differentiated with respect to deformation and fracture properties, with anomalous glasses exhibiting more evidence of densification during indentation, such as Vickers hardness testing.

The following is a detailed description on how to melt and perform the hardness/fracture toughness measurements on the high silica glass and alumina glass with heterogeneity of the additional embodiments of the present invention.

A high silica glass of composition 0.75 $Na_2O$.3.0 $ZnO$.4.0 $Al_2O_3$.92.25 $SiO_2$ (mole percent) is batched using a soda frit, comprising 30.0 $Na_2O$.70.0 $SiO_2$ (mole percent), zinc oxide ($ZnO$), aluminum oxide ($Al_2O_3$) and silica ($SiO_2$) to make a 30 gram batch. The batch masses are 7.0 grams of soda frit, 1.2 grams $ZnO$, 2.0 grams $Al_2O_3$ and 26.1 grams $SiO_2$ having a total mass of 30.0 grams.

After batching, the constituents are mixed by hand for 2 minutes before being poured into molybdenum crucibles and then placed into the center of a vacuum furnace. The vacuum furnace is pumped down to below 8 mbar before starting the melting program. After pulling a vacuum, the vacuum furnace is heated to 1850° C. After heating, the vacuum furnace is held at temperature for 1 hour before being cooled to room temperature. Once cool, the vacuum furnace is purged with air and the vacuum released in order to remove the sample from the furnace. After removal from the furnace, the sample is then ground to a flat surface with SiC polishing paper and then polished with colloidal silica to a median grit size of 0.4 µm.

After polishing, the sample is cleaned by first rinsing three times in deionized $H_2O$ and then cleaned two times with an ultra-sonicator in deionized $H_2O$ for 2 minutes. After cleaning with deionized $H_2O$, the sample is rinsed in methanol and then cleaned two times with an ultra-sonicator in methanol for 2 minutes. After cleaning with methanol, the sample is placed in a drying oven at or above 100° C. for 2 minutes before being placed in a quartz tube with quartz end caps that is placed in an annealing furnace. The last step is performed in order to keep the polished surface free from air particle contamination within the annealing furnace. The annealing furnace is then ramped to the sample annealing temperature and then held at temperature for 1 hour before being cooled to room temperature at 1° C./min.

Figure 7:
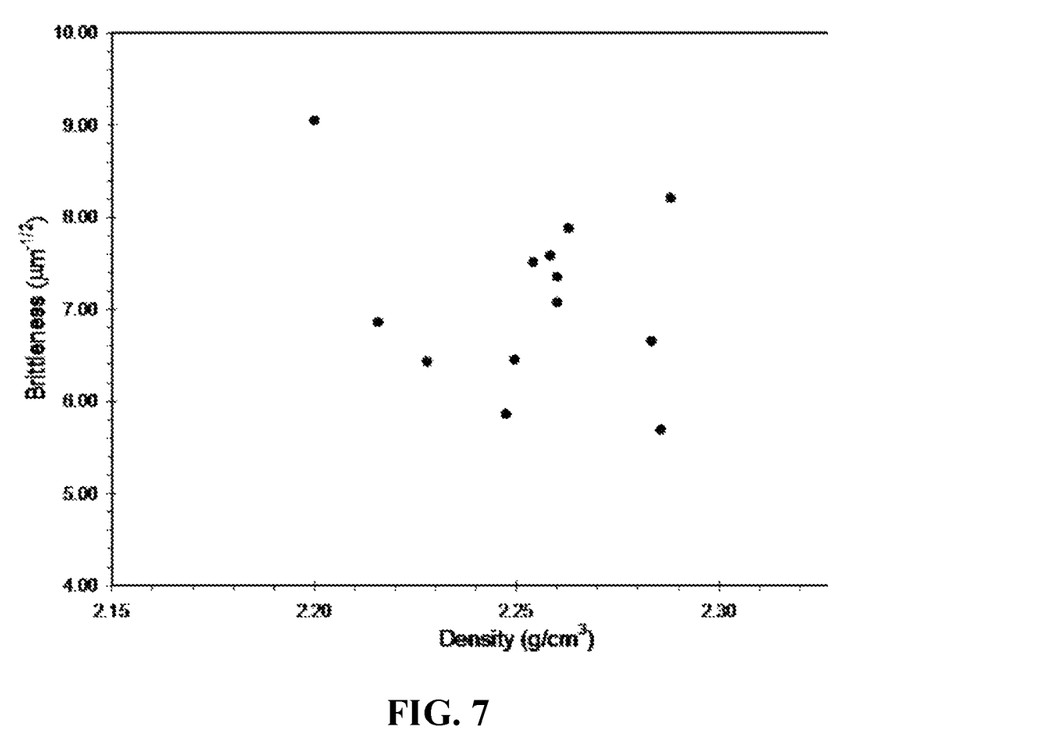
FIG. 7 is a graph illustrating brittleness versus density for various glass compositions of the present invention.

Within an hour of the sample cooling to room temperature after annealing, it is removed from the quartz tube in the annealing furnace and then measured for hardness using the Vickers indentation method ($H_v$) utilizing 20 indentations for an average H. After measuring $H_v$, the sample is allowed to sit in air overnight before the fracture toughness was measured ($K_c$) using the cracks from Vickers indentations made the previous day. The Brittleness (B), as defined by Sehgal and Ito along with Hand and Tadjiev, is the hardness divided by the fracture toughness ($B=H_v/K_c$). FIG. 7 represents a graph illustrating various brittleness versus density plots for glass compositions that fall within the scope of the various additional embodiments of the present invention.

In another example, a heterogeneous alumino-silicate glass of a composition 5.9 $Al_2O_3$·94.1 $SiO_2$ (mole percent) is batched using $Al_2O_3$ and $SiO_2$. After batching, the constituents are mixed by hand for 2 minutes before being poured into molybdenum crucibles and then placed into the center of a vacuum furnace. The vacuum furnace is pumped down to below 8 mbar before starting the melting program. After pulling a vacuum, the vacuum furnace is heated to 1800° C. After heating, the vacuum furnace is held at temperature for 1 hour before being cooled to room temperature. Once cool, the vacuum furnace is purged with air and the vacuum released in order to remove the sample from the furnace. After removal from the furnace, the sample is then ground to a flat surface with SiC polishing paper and then polished with colloidal silica to a median grit size of 0.4 μm.

After polishing, the sample is cleaned by first rinsing three times in deionized $H_2O$ and then cleaned two times with an ultra-sonicator in deionized $H_2O$ for 2 minutes. After cleaning with deionized $H_2O$, the sample is rinsed in methanol and then cleaned two times with an ultra-sonicator in methanol for 2 minutes. After cleaning with methanol, the sample is placed in a drying oven at or above 100° C. for 2 minutes before being placed in a quartz tube with quartz end caps that was placed in an annealing furnace. The last step is performed in order to keep the polished surface free from air particle contamination within the annealing furnace. The annealing furnace is then ramped to the sample annealing temperature and then held at temperature for 1 hour before being cooled to room temperature at 1° C./min.

Within an hour of the sample cooling to room temperature after annealing, it is removed from the quartz tube in the annealing furnace and then measured for hardness using the Vickers indentation method ($H_v$) utilizing 20 indentations for an average H. After measuring $H_v$, the sample is allowed to sit in air overnight before the fracture toughness was measured ($K_c$). The Brittleness (B), as defined by Sehgal and Ito along with Hand and Tadjiev, is the hardness divided by the fracture toughness ($B=H_v/K_c$). FIG. 7 represents a graph illustrating various brittleness versus density plots for glass compositions that fall within the scope of the various additional embodiments of the present invention.

Various data relating to the two examples discussed above are presented in Table 2 below.

Although the invention has been described with reference to certain embodiments detailed herein, other embodiments can achieve the same or similar results. Variations and modifications of the invention will be obvious to those skilled in the art and the invention is intended to cover all such modifications and equivalents.

What is claimed is:

1. A silica glass composition comprising:
   (i) at least about 85 mole percent silicon dioxide; and
   (ii) from 0.2 to about 15 mole percent of one or more dopants selected from B, N, Al, Ge, one or more alkali metals, one or more alkaline earth metals, one or more transition metals, one or more lanthanides, or combinations of any two or more thereof, wherein the silica glass composition contains OH in a concentration of from about 0.5 ppm to about 1000 ppm, a halogen concentration of less than about 100 ppm, and up to about 0.5 mole percent of one or more impurities selected from, refractory metal concentration.

2. The silica glass composition of claim 1, wherein the amount of the one or more dopants in the silica glass composition is in the range of about 0.25 mole percent to about 15 mole percent.

3. The silica glass composition of claim 1, wherein the amount of the one or more dopants in the silica glass composition is in the range of about 0.1 mole percent to about 10 mole percent.

4. The silica glass composition of claim 1, wherein the amount of the one or more dopants in the silica glass composition is in the range of about 0.1 mole percent to about 8 mole percent.

5. The silica glass composition of claim 1, wherein the silica glass composition has a brittleness that is in the range of about 4 $\mu m^{-1/2}$ to about 10 $\mu m^{-1/2}$.

6. The silica glass composition of claim 1, wherein the silica glass composition has a brittleness that is in the range of about 5 $\mu m^{-1/2}$ to about 9 $\mu m^{-1/2}$.

7. The silica glass composition of claim 1, wherein the silica glass composition has a brittleness that is in the range of about 6 $\mu m^{-1/2}$ to about 8 $\mu m^{-1/2}$.

8. The silica glass composition of claim 1, wherein the silica glass composition has a hardness in the range of about 350 HV and about 1300 HV.

9. The silica glass composition of claim 1, wherein the silica glass composition has a hardness in the range of about 400 HV and about 1250 HV.

10. The silica glass composition of claim 1, wherein the silica glass composition has a hardness in the range of about 800 HV and about 1200 HV.

TABLE 2

| Composition (Mole Percent) | Density ($g \cdot cm^{-3}$) | Hardness (GPa) | Fracture Toughness ($MN \cdot m^{-1/2}$) | Brittleness ($mm^{-1/2}$) | $OH^-$ (ppm) |
|---|---|---|---|---|---|
| 0.75$Na_2O$·3.0ZnO·4.0$Al_2O_3$·92.25$SiO_2$ | 2.25 | 4.85 | 0.83 | 5.86 | 2.73 |
| 5.9$Al_2O_3$·94.1$SiO_2$ | 2.26 | 5.00 | 0.71 | 7.08 | 1.21 |

While not wishing to be bound to any one specific application and/or end use, the silica glass compositions of these additional embodiments of the present invention may be suitable for use as transparent armor, laser debris shields, non-transparent armor, laser blocking glass, nose cones, and/or radomes.

11. The silica glass composition of claim 1, wherein the silica glass composition has a density in the range of about 2.1 g/cc to about 2.5 g/cc.

12. The silica glass composition of claim 1, wherein the silica glass composition has a density in the range of about 2.15 g/cc to about 2.45 g/cc.

13. The silica glass composition of claim 1, wherein the silica glass composition has a density in the range of about 2.2 g/cc to about 2.4 g/cc.

14. The silica glass composition of claim 1, wherein the silica glass composition has a density in the range of about 2.2 g/cc to about 2.35 g/cc.

15. The silica glass composition of claim 1, wherein the silica glass composition has a refractory metal concentration of less than about 1000 ppm.

16. The silica glass composition of claim 1, wherein the silica glass composition has a refractory metal concentration of less than about 750 ppm.

17. The silica glass composition of claim 1, wherein the silica glass composition has a refractory metal concentration of less than about 500 ppm.

18. The silica glass composition of claim 1, wherein the silica glass composition has a refractory metal concentration of less than about 250 ppm.

19. The silica glass composition of claim 1, wherein the silica glass composition has a fracture toughness in the range of about 0.5 to about 1 mega Newtons per meter squared.

20. The silica glass composition of claim 1, wherein the silica glass composition has a fracture toughness in the range of about 0.6 to about 1 mega Newtons per meter squared.

21. The silica glass composition of claim 1, wherein the silica glass composition has a fracture toughness in the range of about 0.7 to about 1 mega Newtons per meter squared.

22. The silica glass composition of claim 1, wherein the silica glass composition has an annealing temperature ($T_A$) of at least about 650° C.

23. The silica glass composition of claim 1, wherein the silica glass composition has an annealing temperature ($T_A$) of at least about 850° C.

24. The silica glass composition of claims 1, wherein the silica glass composition has an annealing temperature ($T_A$) of at least about 1050° C.

25. The silica glass composition of claim 1, wherein the silica glass composition has an annealing temperature ($T_m$) of at least about 1200° C.

26. The silica glass composition of claim 1, wherein the silica glass composition has an melting temperature ($T_m$) of at least about 1850° C.

* * * * *